(12) United States Patent
McFadden et al.

(10) Patent No.: US 8,011,293 B2
(45) Date of Patent: Sep. 6, 2011

(54) SPEED COOKING OVEN WITH SLOPED OVEN FLOOR AND REVERSING GAS FLOW

(75) Inventors: David H. McFadden, Lexington, MA (US); David A. Bolton, Southlake, TX (US)

(73) Assignee: Turbochef Technologies, Inc., Atlanta, GA (US)

( * ) Notice: Subject to any disclaimer, the term of this patent is extended or adjusted under 35 U.S.C. 154(b) by 821 days.

(21) Appl. No.: 11/928,020

(22) Filed: Oct. 30, 2007

(65) Prior Publication Data

US 2008/0105135 A1 May 8, 2008

Related U.S. Application Data

(63) Continuation-in-part of application No. 11/098,280, filed on Apr. 4, 2005, now Pat. No. 7,360,533, and a continuation-in-part of application No. 10/614,268, filed on Jul. 7, 2003, and a continuation-in-part of application No. 10/614,532, filed on Jul. 7, 2003, and a continuation-in-part of application No. 11/392,050, filed on Mar. 29, 2006.

(51) Int. Cl.
*A47J 37/00* (2006.01)
*H05B 6/80* (2006.01)
*F24C 15/32* (2006.01)

(52) U.S. Cl. ............ 99/476; 99/474; 219/681; 219/400; 126/21 A

(58) Field of Classification Search ............ 99/474, 99/475, 476; 219/681, 696, 746, 751, 400; 126/21 A, 273 R See application file for complete search history.

(56) References Cited

U.S. PATENT DOCUMENTS

| 2,563,253 | A |   | 8/1951  | Levin           |         |
|-----------|---|---|---------|-----------------|---------|
| 2,704,802 | A | * | 3/1955  | Blass et al.    |         |
| 3,210,511 | A | * | 10/1965 | Smith           |         |
| 3,548,152 | A |   | 12/1970 | Klepzig         |         |
| 3,581,038 | A |   | 5/1971  | Williams        |         |
| 3,783,832 | A | * | 1/1974  | Marsh           | 119/319 |
| 3,813,216 | A |   | 5/1974  | Baur et al.     |         |
| 3,828,760 | A | * | 8/1974  | Farber et al.   |         |
| 3,973,551 | A |   | 8/1976  | Caselani et al. |         |
| 4,154,861 | A | * | 5/1979  | Smith           |         |
| 4,160,144 | A |   | 7/1979  | Kashyap et al.  |         |

(Continued)

FOREIGN PATENT DOCUMENTS

CN 2348616 11/1999

(Continued)

OTHER PUBLICATIONS

International Search Report and Written Opinion dated Feb. 11, 2009 in related Application No. PCT/US2008/081689.

(Continued)

*Primary Examiner* — Reginald L Alexander
(74) *Attorney, Agent, or Firm* — Dean W. Russell; Kristin M. Crall; Kilpatrick Townsend & Stockton LLP

(57) ABSTRACT

A speed cooking oven with sloped oven floor and reversing gas flow is disclosed comprising a cooking cavity, a controller, thermal heating source, blower assembly, air directing means, and a sloped oven floor that directs air flow from the oven side walls to oven center thereby producing a highly turbulent reversed air flow.

13 Claims, 2 Drawing Sheets

U.S. PATENT DOCUMENTS

| | | | |
|---|---|---|---|
| 4,160,145 A | | 7/1979 | Rueggeberg |
| 4,283,614 A | * | 8/1981 | Tanaka et al. |
| 4,316,069 A | | 2/1982 | Fitzmayer |
| 4,327,279 A | * | 4/1982 | Guibert |
| 4,337,384 A | * | 6/1982 | Tanaka et al. |
| 4,338,911 A | * | 7/1982 | Smith |
| 4,350,504 A | | 9/1982 | Diachuk |
| 4,354,083 A | | 10/1982 | Staats |
| 4,403,128 A | | 9/1983 | Takagi et al. |
| 4,409,453 A | * | 10/1983 | Smith |
| 4,431,889 A | * | 2/1984 | Saponara et al. |
| 4,437,396 A | * | 3/1984 | Plattner et al. .......... 99/475 |
| 4,464,554 A | * | 8/1984 | Bakanowski et al. |
| 4,480,164 A | * | 10/1984 | Dills |
| 4,494,525 A | | 1/1985 | Albertsen |
| 4,737,373 A | | 4/1988 | Forney |
| 4,752,268 A | * | 6/1988 | Kataoka et al. |
| 4,786,774 A | | 11/1988 | Kaminaka |
| 4,849,597 A | | 7/1989 | Waigand |
| 4,924,763 A | | 5/1990 | Bingham |
| 4,949,629 A | | 8/1990 | Leary et al. |
| 4,958,412 A | * | 9/1990 | Stanek |
| 4,965,435 A | * | 10/1990 | Smith et al. |
| 5,025,775 A | | 6/1991 | Crisp |
| 5,161,889 A | * | 11/1992 | Smith et al. |
| 5,166,487 A | * | 11/1992 | Hurley et al. |
| 5,204,503 A | | 4/1993 | Maiellano et al. |
| 5,205,274 A | * | 4/1993 | Smith et al. .......... 126/21 A |
| 5,277,105 A | | 1/1994 | Bruno |
| 5,369,250 A | * | 11/1994 | Meredith |
| 5,401,940 A | * | 3/1995 | Smith et al. |
| 5,555,795 A | | 9/1996 | Tsai |
| 5,676,870 A | * | 10/1997 | Wassman et al. |
| 5,717,192 A | * | 2/1998 | Dobie et al. |
| 5,818,014 A | * | 10/1998 | Smith et al. .......... 219/679 |
| 5,825,000 A | | 10/1998 | Jun |
| 5,826,496 A | * | 10/1998 | Jara |
| 5,927,265 A | | 7/1999 | McKee et al. |
| 5,934,178 A | | 8/1999 | Caridis et al. |
| 5,994,672 A | * | 11/1999 | Mestnik |
| 6,012,442 A | | 1/2000 | Faraj |
| 6,058,924 A | | 5/2000 | Pool et al. |
| 6,060,701 A | | 5/2000 | McKee et al. |
| 6,114,664 A | | 9/2000 | Cook et al. |
| 6,250,296 B1 | | 6/2001 | Norris et al. |
| 6,369,360 B1 | | 4/2002 | Cook |
| 6,376,817 B1 | | 4/2002 | McFadden |
| 6,399,930 B2 | | 6/2002 | Day et al. |
| 6,403,937 B1 | | 6/2002 | Day et al. |
| 6,437,303 B1 | | 8/2002 | Dorr et al. |
| 6,472,640 B2 | | 10/2002 | Brown et al. |
| 6,472,647 B2 | | 10/2002 | Lee et al. |
| 6,481,999 B2 | | 11/2002 | Knost |
| 6,655,373 B1 | | 12/2003 | Wiker |
| 6,712,063 B1 | | 3/2004 | Thorneywork |
| 6,713,741 B2 | | 3/2004 | Miller |
| 6,874,495 B2 | | 4/2005 | McFadden |
| 6,909,078 B2 | | 6/2005 | Lee et al. |
| 7,055,518 B2 | | 6/2006 | McFadden |
| 7,087,872 B1 | | 8/2006 | Dobie et al. |
| 7,360,533 B2 | | 4/2008 | McFadden |
| 7,507,938 B2 | | 3/2009 | McFadden |
| 2001/0054605 A1 | | 12/2001 | Suzuki et al. |
| 2002/0162833 A1 | * | 11/2002 | Arntz et al. .......... 219/400 |
| 2002/0179588 A1 | | 12/2002 | Lubrina et al. |
| 2003/0226452 A1 | | 12/2003 | Artt |
| 2004/0118392 A1 | | 6/2004 | McFadden |
| 2004/0123858 A1 | | 7/2004 | McFadden |
| 2004/0200828 A1 | | 10/2004 | Becker et al. |
| 2004/0211765 A1 | | 10/2004 | McFadden |
| 2004/0216732 A1 | | 11/2004 | McFadden |
| 2005/0217503 A1 | | 10/2005 | McFadden |
| 2006/0169272 A1 | | 8/2006 | McFadden et al. |
| 2007/0137633 A1 | | 6/2007 | McFadden |
| 2007/0194011 A1 | | 8/2007 | McFadden |
| 2008/0099008 A1 | | 5/2008 | Bolton et al. |
| 2008/0105133 A1 | | 5/2008 | McFadden et al. |
| 2008/0105135 A1 | | 5/2008 | McFadden et al. |
| 2008/0105136 A1 | | 5/2008 | McFadden |
| 2008/0105249 A1 | | 5/2008 | McFadden et al. |
| 2008/0106483 A1 | | 5/2008 | McFadden et al. |
| 2008/0206420 A1 | | 8/2008 | McFadden |
| 2008/0216812 A1 | | 9/2008 | Dougherty |
| 2008/0296284 A1 | | 12/2008 | McFadden |

FOREIGN PATENT DOCUMENTS

| | | | |
|---|---|---|---|
| DE | 2557867 | * | 6/1977 |
| DE | 3119596 A1 | | 12/1982 |
| DE | 8801849 U1 | | 3/1988 |
| DE | 3734958 A1 | | 4/1989 |
| EP | 0 096 159 | | 12/1983 |
| EP | 0429822 | * | 6/1991 |
| EP | 0429822 A1 | | 6/1991 |
| EP | 0534787 A1 | | 3/1993 |
| GB | 2043237 | | 10/1980 |
| JP | 62218736 A | | 9/1987 |
| JP | 63-317068 | * | 12/1988 |
| WO | WO 9836619 | | 8/1998 |
| WO | WO 2004/014139 | * | 2/2004 |
| WO | WO 2005/041672 | | 5/2005 |
| WO | WO 2005/087009 | * | 9/2005 |
| WO | WO 2006/041814 | * | 4/2006 |
| WO | WO 2006/081202 | * | 8/2006 |
| WO | WO 2006/099394 | | 9/2006 |
| WO | WO 2009058934 | | 5/2009 |

OTHER PUBLICATIONS

Rueggeberg, 'A Multislotted Waveguide Antenna for High-Powered Microwave Heating Systems,' IEEE Transactions on Industry Applications, IA-16(6):809-813 (1980).
Supplementary Search Report dated Mar. 4, 2009 in related European Application No. 04816933.
Response dated Dec. 17, 2008 in related U.S. Appl. No. 10/591,074.
Response dated Jan. 16, 2009 in related U.S. Appl. No. 11/392,050.
Response dated Jan. 16, 2009 in related U.S. Appl. No. 10/614,532.
Office Action dated Feb. 5, 2009 in related U.S. Appl. No. 11/928,063.
Response dated Nov. 13, 2008 in related U.S. Appl. No. 11/663,253.
Office Action dated Mar. 18, 2009 in related U.S. Appl. No. 11/663,253.
Response dated Jan. 23, 2009 in related U.S. Appl. No. 10/614,268.
U.S. Appl. No. 11/908,169, filed Sep. 10, 2007, McFadden.
U.S. Appl. No. 11/928,037, filed Oct. 30, 2007, McFadden.
U.S. Appl. No. 12/045,063, filed Mar. 10, 2008, Dougherty.
Office Action dated Apr. 14, 2009 in related U.S. Appl. No. 10/614,532.
Response dated Jul. 7, 2009 in related U.S. Appl. No. 10/614,532.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/39,050.
Office Action dated Apr. 15, 2009 in related U.S. Appl. No. 10/591,074.
Abstract JP2000254001 published Mar. 8, 1999.
Response dated Aug. 4, 2009 in related U.S. Appl. No. 11/928,063.
Office Action dated Jul. 15, 2009 in related U.S. Appl. No. 11/908,169.
Office Action dated Jul. 23, 2009 in related U.S. Appl. No. 11/928,007.
Response dated Jul. 21, 2009 in related U.S. Appl. No. 11/663,253.
Partial International Search report in related Application No. PCT/US2008/056358.
Office Action dated Oct. 3, 2008 in related U.S. Appl. No. 10/591,074.
Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.

Office Action dated Feb. 4, 2008 in related U.S. Appl. No. 10/614,268.
Response dated Aug. 4, 2008 in related U.S. Appl. No. 10/614,268.
Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
Office Action dated Jun. 22, 2011 in U.S. Appl. No. 11/928,007.

* cited by examiner and claims priority
SPEED COOKING OVEN WITH SLOPED OVEN FLOOR AND REVERSING GAS FLOW

CROSS REFERENCE TO RELATED APPLICATIONS

The present application claims priority to International Application No. PCT/US2005/035605 filed 5 Oct. 2005; claims priority to U.S. application Ser. No. 11/098,280 filed 4 Apr. 2005; claims priority to International Application No. PCT/US2006/009075 filed 14 Mar. 2006 and claims priority to U.S. application Ser. No. 11/392,050 filed 29 Mar. 2006. Upon entry into the National Stage in the United States of America, the present application will be a continuation-in-part of U.S. application Ser. No. 11/098,280 filed 4 Apr. 2005; will be a continuation-in-part of U.S. application Ser. No. 10/614,268 filed 7 Jul. 2003; will be a continuation-in-part of U.S. application Ser. No. 10/614,532 filed 7 Jul. 2003; and will be a continuation-in-part of U.S. application Ser. No. 11/392,050 filed 29 Mar. 2006.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with International Application No. PCT/US2005/035605 filed 5 Oct. 2005, contains technical disclosure in common with International Application No. PCT/US2006/009075 filed 14 Mar. 2006, contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All of the applications set forth above are incorporated herein by reference as if fully set forth.

FIELD OF THE INVENTION

The present invention relates to a single rack cook (slot oven) bottom side convection flow (relative to the food) method of speed cooking that overcomes issues associated with the impingement style microwave/convection ovens while still maintaining single rack cooking speeds greater than 5 times.

DESCRIPTION OF RELATED ART

Several high speed cooking ovens featuring impingement style convection flow fields coupled with microwave energy have been developed with some featuring opposed primary energy flows with impingement convection heat transfer onto the upper surface of the food product and microwave being launch from the floor of the oven into the bottom of the food. To provide bottom/side convection heat transfer, the impingement airflow is pulled around the sides of the food product and cross the bottom of the food via low pressure air return duct located directly below the food (so-called shroud effect).

The flow beneath the food is accomplished using a platter which directs air along the bottom side of the food (standoffs used to elevate the food creating airflow passages) with the flow exiting downward through the platter using a series of holes. The microwave is launched from below and enters the food after passing through the platter. While this approach produces very high speed cooking (5-10 times faster than conventional oven technology) with high quality, it has the many limitations including non-uniform energy fluxes (convection and microwave) between the top and bottom of the food that requires complex control of the microwave and convection heating system to achieve rapid high quality cooking. In general, both the microwave and convection energy flows are adjusted in level several times during the cook cycle requiring the use of expensive intensive blower motors and speed controls, microwave power modulation, and an complex oven controller/user interface (needed to input multiple power and time settings for a given recipe)

Achieving high speed with quality requires a fairly complex and expensive variable speed convection blower motor control and electronic oven controls. The blower must have variable speed capability in order to provide lower convective heat transfer rates when cooking more delicate products such as a cake.

Lack of independent top and bottom convection (browning) heating given top impingement flow must wrap around food product and flow under the product needed for bottom side heating. This requires use of an expensive and fragile ceramic platter that is transparent to microwave as well as configured with a flow channels needed for bottom side browning. Given the very rapid circulation of air through the oven (high velocity impingement), the ovens are noisy. Uniform vertical jet flow fields over a range of flow rates needed for cooking are difficult to achieve over the cooking rack area. A common outcome of this lack of uniformity is to restrict or reduce the cook zone to that area that experiences relative to rack which reduces the cooking capacity for a given cavity size or requires a larger oven.

Means to overcome this problem are complex with rotation of the food under the jets is a common solution. Using rotation to compensate for jet non-uniformity also reduces the useful cooking area of the appliance by at least 25%. Some designs further complicate the ability to achieve a uniform flow conditions by having the vertical jet flow pattern coupled to the ceramic platter used to channel flow under the food. This uniformity is now also a function of the shape and size of the pan. Their construction is complex given the need to add or modify the oven cavity roof for impingement nozzle plates/supply ducts, the bottom for microwave launching, and the back wall for ducts/catalysts and blower hardware. This results in a small cook chamber volume as compared to the entire cavity (volume that sees hot air). Additionally, it is difficult to maintain a microwave seal to the cavity floor (microwave launches through the oven floor) to prevent grease/liquid contamination of the wave guides Grease control given the high velocity of the impinging jets tend to entrain a great deal of grease (particles and vapor) into the convection air which quickly soils the oven cavity surfaces and requires a large catalyst (cost and pressure drop requiring a bigger blower) to control the airborne grease Still other approaches utilize a different impingement approach where vertical air jets are generated from the oven roof and floor. The bottom or floor jets provide for bottom side cooking while the roof jets provide top side cooking/browning. In this embodiment the microwaves are launched from above the food. This approach has several problems such as the oven floor located air nozzle plate and its supply duct are very difficult to maintain given their susceptibility to food spoils and grease accumulation.

To utilize the entire (or nearly) cooking area (rack), the top and bottom air jets must be very uniform in velocity or non-uniform cooking/browning will result. This adds complexity to the airflow system.

It also makes uniform jet fields difficult to achieve at flows other than the design flow rates which are needed when food products that need a less aggressive airflow are baked. Such non-uniform flows will reduce to the cook area to a region where a reasonable flow field exits to cook to a good quality or will require that the convection flows be greatly reduced resulting in longer cook times.

The general oven construction is complex as the supply duct to the roof air plate must also act as a launch box for the microwaves. This requires that the roof jet plate be transparent to microwaves (e.g., ceramic plate with jet holes). The floor ducts may become complex part if they are designed to be removed for cleaning/servicing. The nature of having supply ducts on the floor and roof of the oven greatly reduced the useful volume (cook chamber) of the oven as much as half of the height of the cavity is occupied by these air channels.

On the other hand, the more traditional microwave convection oven is a relatively simple rapid cook oven capable of cooking speeds of up to 3 times. This design features a convection blower wheel/motor mounted on the back wall (or side wall) with the oven air being drawn directly into the inlet and being discharged from the blower wheel perimeter. A baffle plate isolates the blower discharge form the inlet and creates an outward flow along the oven side walls, roof and floor with the airflow turning back over the food to the blower inlet. The baffle plate looks like a false back wall with gaps around the edges for air discharge and an opening in the center for air return. Microwave energy in these ovens has been introduced either from top, bottom, or side walls. These designs in general have a number of limitations. Microwave launch method cannot equally illuminate multiple racks or pans of food and as a result, the microwave energy is necessarily limited in order to avoid hot spots and poor quality cooking.

For a top/roof or bottom/floor microwave, the pans (food) situated right above (bottom launch) or right below (top launch) to the microwave launch "obscure" the microwave energy from the pans further away (microwave energy density argument). To compensate for these non-uniformity's, the maximum microwave energy is limited. As a result, most traditional microwave convection ovens are really single rack/position rapid cook ovens. Many of these top or bottom launch require a either a mode stirrer, rotating food platter, or in some cases both the mode stirrer and rotating tray. In addition to the microwave non-uniformity's, the convection air flow also has non-uniform behavior. This results in lower airflow rates in the oven limiting the convection heat transfer rate and hence limits the cooking speed of the oven. These oven designs have the oven air flowing down the side walls and then turning flowing over the products to the blower inlet. This approach has all the air returning into the blower inlet opening usually located in the center of the back or side wall. The center pan often has a distinctive "V" cooking pattern near the blower inlet. This creates flow non-uniformity's from the center rack position to the top/bottom positions. Balancing the flow over several pans is difficult as the air is drawn to the center of the back wall. As discussed above, imparting high flows to the oven in order to achieve high cook speeds results in non-uniform cooking.

Usually, the discharge from the baffle plate is adjusted with air flow vanes or flow restrictions to achieve a more uniform flow state. The effectiveness of this approach is limited and in general the oven airflow rates are maintained at modest flows. In addition to the above mentioned issues relative to cooking speeds, these oven designs do not manage or handle airborne grease entrained by the convection air. These ovens need to be operated under a hood when cooking meats or grease laden foods.

Matching the general microwave and convection heat transfer energy patterns such that uniform cooking conditions can be achieved on the top and bottom of the food product. This is key to rapid uniform cook over a large area.

SUMMARY OF THE INVENTION

The invention relates to a single rack cook (slot oven) bottom side convection flow (relative to the food) method that overcomes issues associated with the impingement style microwave/convection ovens while still maintaining single rack cooking speeds greater than 5 times. Improvements described in this invention include: (1) a bottom side (relative to the food product) reversing gas flow that tends to average flow conditions across the bottom of a food product or container holding a food product while providing high heat transfer rates for rapid cooking; (2) an oven cavity floor that is continuous and not interrupted by air ducts or microwave feeds; (3) a means to control or enhance bottom side (relative to the food) airflow/heat transfer using smaller air flows to direct the primary bottom side cooking airflows rather than mechanical means; (4) providing a bottom side flow field where grease entrainment is reduced by eliminating the vertical impingement style flow that tends to throw or kick grease into the air stream from both the pan and food product.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
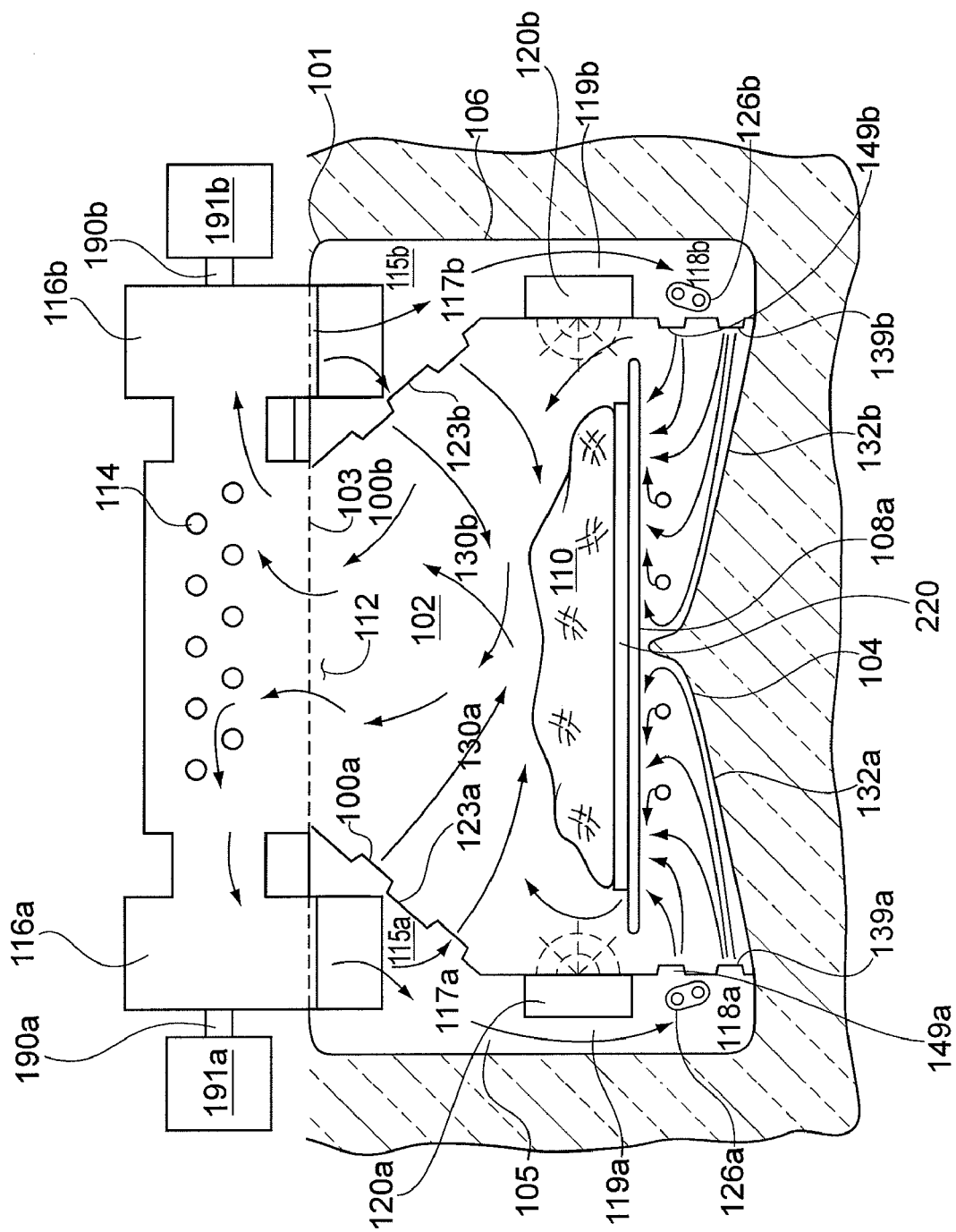
FIG. 1 is a side view of the speed cooking oven with sloped floor and reversing gas flow.
Figure 2:
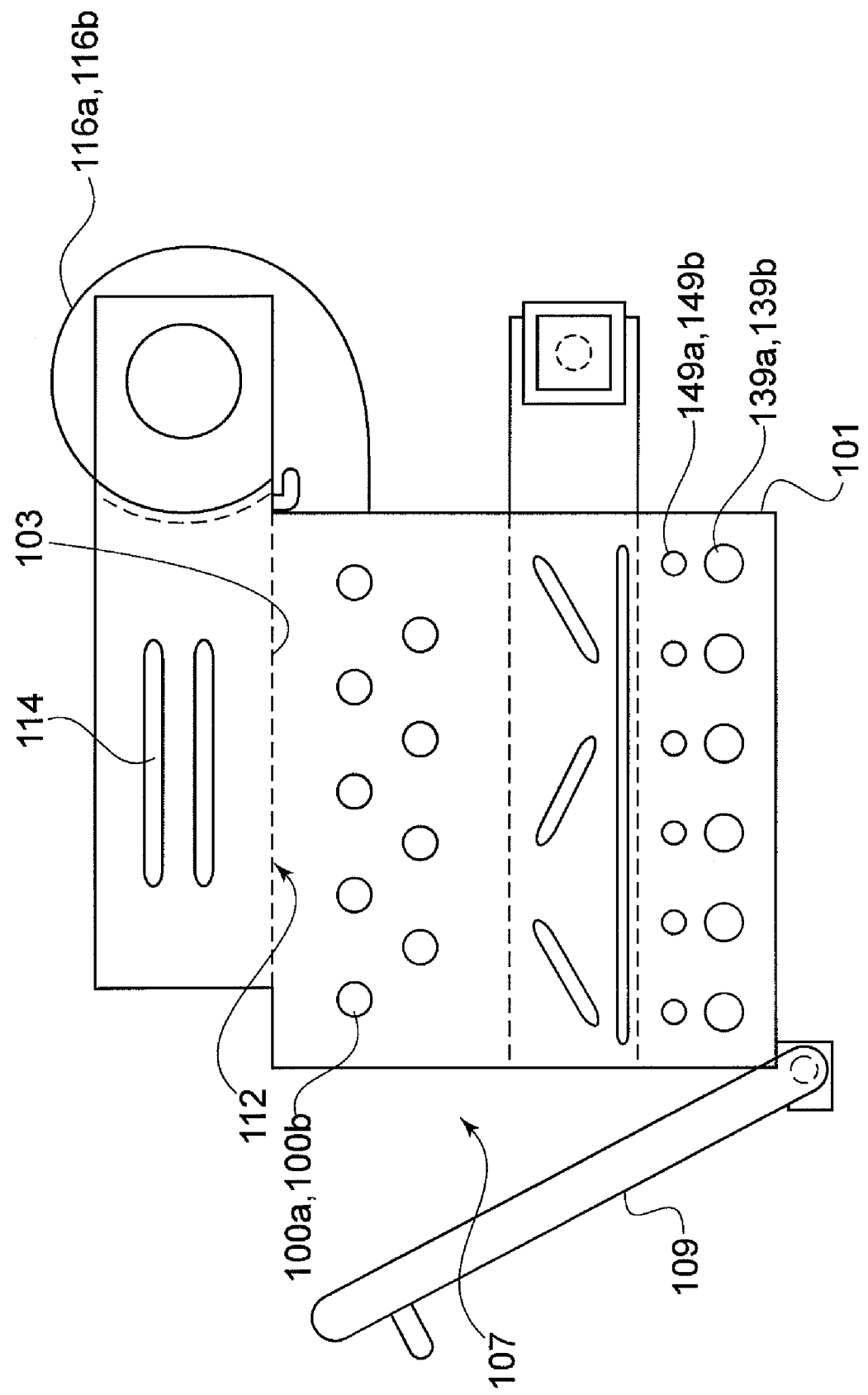
FIG. 2 is a front view of the speed cooking oven with sloped floor and reversing gas flow.

An exemplary version of the speed cook oven with sloped floor and reversing gas flow is shown in FIGS. 1-2. Appliance 101 includes an oven cavity 102 generally defined by a top wall 103, a bottom wall 104 which angles or slopes up from the side walls upward to the centerline of oven cavity 102 (providing bottom side primary gas flow directional control and enabling very turbulent flow on the bottom side of the food product), left side wall 105, right side wall 106, a back wall 194 and a front wall 195. Oven cavity 102 also has associated therewith an access opening 107 through which food items 110 may be placed within oven cavity 102 upon cooking rack 108a, FIG. 1 or within cooking pan or vessel 220, FIG. 1. Cooking appliance 101 has a hinged door 109 pivotally attached to the oven front for closing the cooking section opening 107 during cooking operation. Hinged door 109 may be swung between an open position wherein the door allows access to oven cavity 102 and a closed position wherein the door covers the opening into oven cavity 102. Although illustrated as a hinged door pivotally attached at the left side of the front of the oven, the door may be hinged on the right side, bottom side or top side.

Referring to FIGS. 1-2, the speed cooking oven is comprised of two independent gas transfer systems, described herein as a left gas transfer system and a right gas transfer system wherein left gas transfer system delivers gas to and from the left side of the oven cavity 102, and right gas transfer system delivers gas to and from the right side of the oven cavity 102. Although each gas transfer system is described separately, the systems are identical in their configuration (although is not required that they be identical) and operation and serve to distribute gas to the respective sides of oven cavity 102.

Gas is transferred to and from the left side of oven cavity 102 via a left gas transfer system, which is comprised of a left gas transfer section 115a, extending from the front to back of oven top wall 103, along the left side of top wall 103. In fluid connection with left gas transfer section 115a is top gas egress opening 112, which is open to, and in fluid connection with oven cavity 102 through top wall 103. Top gas egress opening 112 is substantially rectangular, although other geometries may be utilized, and is centrally located within oven top wall 103 and provides for the passage of gas from oven cavity 102 into left gas transfer section 115a, as gases are removed from oven cavity 102 through top egress gas egress opening 112. As gas is drawn through top gas egress opening 112, the gas passes across left heating means 114. Heating means 114 may include a direct fired thermal energy source, indirect fired thermal energy, propane, natural gas, electric resistance heating elements, and other thermal means, and applicant intends to encompass within the language any structure presently existing or developed in the future that performs the same function. After the gas is drawn across left heating means 114 it is then drawn back to blower wheels 116a, 116b. In fluid connection with, and located within left gas transfer section 115a is a left gas accelerator, illustrated as left blower wheel 116a. Connected to left blower wheel 116a is blower motor shaft 190a, which is driven by a direct shaft from electric motor 191a. Other means may be employed for coupling blower wheel 116a to electric motor 191a, such as belt drive, and the means is not limited to direct drive. Blower wheel 116a takes gas from oven cavity 102 and delivers the gas via gas transfer section 117a to the left top side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Top left gas transfer section 117a is in fluid connection with a lower left gas transfer section 118a via a left vertical gas transfer section 119a. Left vertical transfer section 119a is bounded by left side wall 105 and a left microwave waveguide section 120a.

As gas is discharged into top left gas transfer section 117a, a selected portion of said gas is directed through apertures located within a top left slotted or perforated discharge plate 123a. Gas is then distributed into oven cavity 102. Apertures 100a may be slotted, regularly formed or irregularly formed apertures and are illustrated herein as nozzles, and applicant intends to encompass within the language any structure presently existing or developed in the future that performs the same function as 100a, 139a, 149a and to be discussed further herein 100b and 139b and 149b. Gas is distributed through various apertures 100a located within left discharge plate 123a and delivered onto the left top and left side portions of the food product 110. As used herein, the terms "flow control means" "gas deflecting means" "transfer deflection mechanism" and "flow control means" all have the same meaning and refer to means to control gas flow within the oven. Indeed, certain speed cooking operations may call for more gas flow to the lower part of the speed cooking oven, while other operations will call for little or no gas flow to the bottom side of the oven for delivery to the bottom of the food product. Gas that flows to lower left gas delivery section 118a may be re-heated, if required, by lower left heating means 126a, FIG. 1. As used herein the term "gas" is used to include any fluid mixture suitable for cooking food products. Bottom side primary gas flow nozzles 139a and 139b, FIG. 1 are located on the left and right side walls near the floor. Bottom side flow control gas nozzles 149a, 149b are located just above primary flow nozzles 139a, 139b.

Gas is transferred to and from the right side of oven cavity 102 via a right gas transfer system, which is comprised of a right gas transfer section 115b, extending from the front to back of oven top wall 103, along the right side of top wall 103. In fluid connection with right gas transfer section 115b is top gas egress opening 112, which is open to, and in fluid connection with oven cavity 102 through top wall 103. Top gas egress opening 112 is substantially rectangular, although other geometries may be utilized, and is centrally located within oven top wall 103 and provides for the passage of gas from oven cavity 102 into right gas transfer section 115b, as gases are removed from oven cavity 102 through top egress gas egress opening 112. As gas is drawn through top gas egress opening 112, the gas passes across right heating means 114. Heating means 114 may include a direct fired thermal energy source, indirect fired thermal energy, propane, natural gas, electric resistance heating elements, and other thermal means, and applicant intends to encompass within the language any structure presently existing or developed in the future that performs the same function. After the gas is drawn across right heating means 114 it is then drawn back to blower wheel 116b. In fluid connection with, and located within right gas transfer section 115b is a right gas accelerator, illustrated as right blower wheel 116b. Connected to right blower wheel 116b is blower motor shaft 190b, which is driven by a direct shaft from electric motor 191b. Other means may be employed for coupling blower wheel 116b to electric motor 191b, such as belt drive, and the means is not limited to direct drive. Blower wheel 116b takes gas from oven cavity 102 and delivers the gas via gas transfer section 117b to the right top side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Top right gas transfer section 117b is in fluid connection with a lower right gas transfer section 118b via a right vertical gas transfer section 119b. Right vertical transfer section 119b is bounded by right side wall 105 and a right microwave waveguide section 120b.

As gas is discharged into top right gas transfer section 117b, a selected portion of said gas is directed through apertures located within a top right slotted or perforated discharge plate 123b. Gas is then distributed into oven cavity 102. Apertures 100b may be slotted, regularly formed or irregularly formed apertures and are illustrated herein as nozzles, and applicant intends to encompass within the language any structure presently existing or developed in the future that performs the same function as 100a, 139a, 149a, 100b and 139b and 149b. Gas is distributed through various apertures 100b located within right discharge plate 123b and delivered onto the right top and right side portions of the food product 110. As used herein, the terms "flow control means" "gas deflecting means" "transfer deflection mechanism" and "flow control means" all have the same meaning and refer to means to control gas flow within the oven. Indeed, certain speed cooking operations may call for more gas flow to the lower part of the speed cooking oven, while other operations will call for little or no gas flow to the bottom side of the oven for delivery to the bottom of the food product. Gas that flows to lower right gas delivery section 118b may be re-heated, if required, by lower right heating means 126a, FIG. 1. Bottom side primary gas flow nozzles 139a and 139b, FIG. 1 are located on the right and 143b sidewalls near the floor. Bottom side flow control gas nozzles 149a, 149b are located just above primary flow nozzles 139a, 139b.

As gas flow 130a is directed toward the center of oven cavity 102 from the left side and gas flow 130b is directed toward the center of oven cavity 102 from the right side, the gas flows meet upon the surface of the food product and turbulently mix, conflict and collide, thereby causing high heat transfer and rapid cooking of the food product. This turbulently mixed gas flow directed at the food product can best be described as glancing, conflicting and colliding gas flow patterns that spatially average the gas flow over the surface area of the food product producing high heat transfer and moisture removal rates at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein the term "mixing" refers to the glancing, conflicting and colliding gas flow patterns that meet at and upon the top surface, the bottom surface and the left and right side surfaces of the food product and produce high heat transfer and speed cooking of the food product due to spatial averaging of the gas flow heat transfer. As used herein, the terms "mix", "mixing", "turbulent mix" and "turbulent mixing". The same mixing of gas flow occurs upon the lower surface and lower side surfaces of food product 110 by lower gas flows 132a and 132b, FIG. 1. As shown in FIGS. 1 and 2, the bottom side reversing flow is consists of right and left side primary and control flow nozzles.

Primary flow nozzles 139a, 139b are configured as a row positioned from the cavity front to cavity back and smaller flow control nozzles 149a, 149b FIG. 1, are positioned above each primary nozzle and are used to provide edge heat transfer as well as directing the primary flow towards the oven center. Gas flow split (distribution) between the primary and control nozzles is about 4 to 1. Oven cavity floor 104 is sloped upward toward the center of the oven from the right 106 and left 105. The slope of cavity floor 104 is such that primary jets 139a, 139b attach to upward sloping floor 104 and are directed to the oven center.

As shown in FIG. 1, the reversing gas flow paths tend to create a high heat transfer capability by turning highly turbulent as they reach the oven centerline and reverse direction while flowing beneath food product 102 or its container. The primary airflow stays attached to upward sloping cavity floor 102 until buoyancy and other flow field interactions lift the primary air jets towards the food and reverse direction as the primary flow flows under the food towards the blower return. The ability to adhere the jets to the oven cavity flow while reducing the flow cross section creates a relatively uniform flow field across the bottom of the food. The jets tend to spread as they approach the oven center. The action of reversing the flow and the resulting flow field acceleration provides high heat transfer capability.

For the primary air to attach to the cavity floor the primary nozzles centerlines must be positioned less than 1½ nozzle diameter from the line defined by the intersection of cavity floor, and right and left hand walls. Typical primary nozzle flow average jet velocities are typically in between 3000 to 7000 ft/min.

To enhance the control of the primary air flow, smaller air flow control nozzles 149a, 149b are located above the primary nozzles. The jet flows leaving these nozzles prevent the primary jets from lifting off the cavity floor in a premature manner which typically would occur when one or several small food products are being prepared. In addition to controlling the primary air flow, they also provide edge and perimeter bottom side browning.

Advantages of the reversing gas flow including: (1) bottom side airflow/convection heat transfer geometry independent of cavity width given the ability to control oven floor profile to enhance flow attachment; (2) generation of relatively uniform convective bottom side gas flow without the use of moving nozzles, rack translation/rotation, or other mechanical means to control the flow distribution on the underside of the food product; (3) avoidance of the need for impingement air ducts to be located on the floor of the oven thus creating a smooth oven bottom that is easily maintained; and (4) elimination of an air shroud airflow for bottom and side convection heating. In addition, the side/corner air supply ducts location avoids grease and liquid spills. The bottom side reversing airflow style of the invention greatly reduces grease entrainment by separating the out the heavier grease particle in the reversing and spiraling flow field created beneath the food product or container.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

The invention claimed is:

1. A rapid cook oven for cooking a food product with hot gas, the rapid cook oven comprising:
   a housing;
   a gas delivery system;
   a thermal means for heating the gas;
   an oven cavity disposed within the housing, the oven cavity comprising side walls comprising a left side wall and a right wall and an angled bottom wall that slopes up from the left side wall, and slopes up from the right side wall, such that a center of the bottom wall reaches an apex at a midpoint between the left and right side walls;
   at least one primary gas nozzle for circulating gas into the cooking chamber; and
   at least one secondary gas nozzle positioned above the at least one primary gas nozzle for controlling and directing gas flow from the at least one primary gas nozzle.

2. The rapid cook oven according to claim 1, further comprising:
   a pan for holding the food product, the pan being continuous without apertures;
   wherein configuration of the at least one primary gas nozzle, the at least one secondary gas nozzle, the angled bottom wall, and the pan, produce turbulent air flow at the underneath surface of the pan.

3. The rapid cook oven according to claim 1,
further comprising a pan configured to prevent byproducts from the food product from accumulating on the angled bottom wall.

4. The rapid cook oven according to claim 1, further comprising:
a pan for holding the food product, the pan being continuous without apertures;
wherein configuration of the at least one primary gas nozzle, the at least one secondary gas nozzle, the angled bottom wall, and the pan, produce turbulent air flow reversal at the underneath surface of the pan.

5. The rapid cook oven according to claim 1, further comprising:
a pan for holding the food product, the pan being continuous without apertures;
wherein configuration of the at least one primary gas nozzle, the at least one secondary gas nozzle, the angled bottom wall, produce convention flow and edge flow beneath the surface of the pan.

6. The rapid cook oven according to claim 1, further comprising:
a plurality of primary gas nozzles arranged in a row from the front of the cooking chamber toward the back of the cooking chamber.

7. The rapid cook oven according to claim 6, further comprising:
a plurality of secondary gas nozzles arranged in row above the row of primary gas nozzles.

8. The rapid cook oven according to claim 1, wherein the ratio of the flow volume of the at least one primary gas nozzle to the flow volume of the at least one secondary gas nozzle is about four to one.

9. The rapid cook oven according to claim 1, wherein the average flow velocity of the gas exiting the at least one primary gas nozzle is between about 3,000 feet per minute and about 7,000 feet per minute.

10. The rapid cook oven according to claim 1, wherein the gas delivery system comprises at least one gas directing means operably associated with the oven cavity for providing conflicting and colliding airflow near the surface of the food product.

11. The oven according to claim 1, further comprising:
a control system for selectively controlling the at least one primary nozzle and the at least one secondary nozzle.

12. The oven according to claim 1, further comprising:
a microwave cooking subsystem for sending microwave energy into the oven cavity.

13. The oven according to claim 1, further comprising:
a control system for activating the at least one primary nozzle and the at least one secondary nozzle according to a preprogrammed schedule.

* * * * *